(12) United States Patent
Leleannec et al.

(10) Patent No.: US 11,991,394 B2
(45) Date of Patent: May 21, 2024

(54) SYNTAX ELEMENTS FOR VIDEO ENCODING OR DECODING

(71) Applicant: InterDigital VC Holdings, Inc., Wilmington, DE (US)

(72) Inventors: Fabrice Leleannec, Mouaze (FR); Franck Galpin, Thorigne-Fouillard (FR); Tangi Poirier, Thorigne-Fouillard (FR); Edouard Francois, Bourg des Comptes (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/734,156

(22) PCT Filed: May 28, 2019

(86) PCT No.: PCT/US2019/034129
§ 371 (c)(1),
(2) Date: Dec. 1, 2020

(87) PCT Pub. No.: WO2019/236335
PCT Pub. Date: Dec. 12, 2019

(65) Prior Publication Data
US 2022/0141493 A1 May 5, 2022

(30) Foreign Application Priority Data

Jun. 7, 2018 (EP) ..................................... 18305693
Jul. 2, 2018 (EP) ..................................... 18305849

(51) Int. Cl.
*H04N 7/12* (2006.01)
*H04N 19/176* (2014.01)
(Continued)

(52) U.S. Cl.
CPC ........... *H04N 19/70* (2014.11); *H04N 19/176* (2014.11); *H04N 19/186* (2014.11); *H04N 19/96* (2014.11)

(58) Field of Classification Search
CPC .... H04N 19/70; H04N 19/176; H04N 19/186; H04N 19/96
(Continued)

(56) References Cited

U.S. PATENT DOCUMENTS

2014/0192904 A1* 7/2014 Rosewarne ............ H04N 19/60
375/240.29
2014/0346611 A1 12/2014 Kim et al.
(Continued)

FOREIGN PATENT DOCUMENTS

CN 105027567 A 11/2015
RU 2575986 C2 2/2016
(Continued)

OTHER PUBLICATIONS

Bordes et al, "Description of SDR, HDR and 360 Video Coding Technology Proposal by Qualcomm and Technicolor—Medium Complexity Version", Joint Video Experts Team (JVET) of ITU-T SG16 WP3 and ISO/IEC JTC1/SC29/WG11, Document JVET-J0022r1, 10th Meeting, San Diego, California, US, Apr. 10, 2018, 83 pages.

(Continued)

*Primary Examiner* — Gims S Philippe
(74) *Attorney, Agent, or Firm* — CONDO ROCCIA KOPTIW LLP

(57) ABSTRACT

A video coding system uses a value of a chroma quantization parameter table to quantize or de-quantize chroma values of a block of the video, the chroma quantization parameter table being directly coded in a set of parameters at the picture level or at the sequence level of the coded video (Continued)

stream. A corresponding encoding method, encoding device, decoding method, decoding device, video signal, computer program and non-transitory readable medium are proposed.

20 Claims, 8 Drawing Sheets

(51) Int. Cl.
*H04N 19/186* (2014.01)
*H04N 19/70* (2014.01)
*H04N 19/96* (2014.01)

(58) Field of Classification Search
USPC .................................................. 375/240.26
See application file for complete search history.

(56) References Cited

U.S. PATENT DOCUMENTS

| | | | |
|---|---|---|---|
| 2014/0376611 A1 | 12/2014 | Kim et al. | |
| 2015/0078456 A1* | 3/2015 | Hannuksela | H04N 19/42 |
| | | | 375/240.01 |
| 2015/0195577 A1* | 7/2015 | Hannuksela | H04N 19/70 |
| | | | 375/240.25 |
| 2016/0286230 A1 | 9/2016 | Li et al. | |
| 2017/0242748 A1 | 9/2017 | Seregin et al. | |
| 2017/0272748 A1 | 9/2017 | Seregin et al. | |
| 2018/0020241 A1* | 1/2018 | Li | H04N 19/18 |
| 2018/0205949 A1* | 7/2018 | Hsiang | H04N 19/186 |
| 2018/0278958 A1* | 9/2018 | Hsiang | H04N 19/12 |
| 2018/0288446 A1* | 10/2018 | An | H04N 19/70 |
| 2021/0037237 A1* | 2/2021 | Hsiang | H04N 19/159 |
| 2021/0092372 A1* | 3/2021 | Misra | H04N 19/70 |

FOREIGN PATENT DOCUMENTS

| | | |
|---|---|---|
| RU | 2636692 C2 | 11/2017 |
| WO | 2014106692 A1 | 7/2014 |
| WO | 2016074567 A1 | 5/2016 |
| WO | WO 2017123980 A1 | 7/2017 |

OTHER PUBLICATIONS

Li et al, "Multi-Type-Tree", Joint Video Exploration Team (JVET) of ITU-T SG 16 WP3 and ISO/IEC JTC 1/SC 29/WG 11, Document JVET-D0117r1, 4th Meeting, Chengdu, China, Oct. 15, 2016, 3 pages.

Chen et al, "Algorithm Description of Joint Exploration Test Model 7 (JEM 7)", Joint Video Exploration Team (JVET) of ITU-T SG 16 WP3 and ISO/IEC JTC 1/SC 29/WG 11, Document JVET-G1001-v1, Turin, Italy, Jul. 13, 2017, 48 pages.

Anonymous, "Reference Software for ITU-T H.265 High Efficiency Video Coding", Telecommunication Standardization Sector of ITU, Recommendation ITU-T H.265.2, Series H: Audiovisual and Multimedia Systems—Infrastructure of Audiovisual Services—Coding of Moving Video, Oct. 2014, 12 pages.

Anonymous, "Advanced Video Coding for Generic Audiovisual Services", Telecommunication Standardization Sector of ITU, Recommendation ITU-T H.264, Series H: Audiovisual and MulitMedia Systems—Infrastructure of Audiovisual Services—Coding of Moving Video, May 2003, 282 pages.

Van Der Auwera et al, "Description of Core Experiment 3: Intra Prediction and Mode Coding", Joint Video Experts Team (JVET) of ITU-T SG 16 WP 3 and ISO/IEC JTC 1/SC 29/WG 11, Document JVET-J1023_r2, 10th Meeting: San Diego, California, USA, Apr. 10, 2018, 49 pages.

Le Leannec et al, "Asymmetric Coding Units in QTBT", Joint Video Exploration Team (JVET) of ITU-T SG 16 WP 3 and ISO/IEC JTC 1/SC 29/WG 11, Document No. JVET-D0064, 4th Meeting, Chengdu, China, Oct. 15, 2016, 10 pages.

English Language Translation, Russia Patent No. RU 2575986 C2.

English Language Translation, Russia Patent No. RU 2636692 C2.

Wieckowski et al., "NextSoftware: An alternative implementation of the Joint Exploration Model (JEM)", JVET of ITU-T SG 16 WP 3 and ISO/IEC JTC 1/SC 29/WG 11; 8th Meeting: Macao, CN; JVET-H0084, Oct. 18-25, 2017, 12 pages.

\* cited by examiner

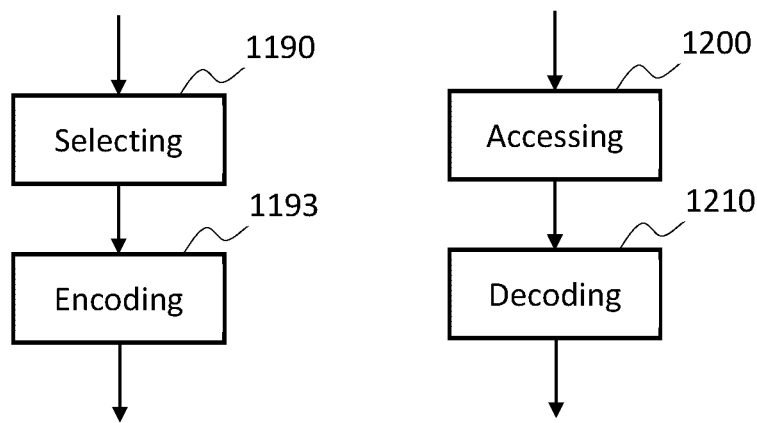
FIG. 11                     FIG. 12

US 11,991,394 B2

SYNTAX ELEMENTS FOR VIDEO ENCODING OR DECODING

CROSS REFERENCE TO RELATED APPLICATIONS

This application is the national stage entry under 35 U.S.C. § 371 of International Application PCT/US20191034129, filed May 28, 2019 which was published in accordance with PCT Article 21(2) on Dec. 12, 2019, in English, and which claims the benefit of European Patent Application No. 18305693.6, filed Jun. 7, 2018 and European Patent Application No. 18305849.4, filed Jul. 2, 2018.

TECHNICAL FIELD

At least one of the present embodiments generally relate to syntax elements for video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to a first aspect of at least one embodiment, a video signal is presented, the video signal being formatted to include information according to a video coding standard and comprising a bitstream having video content and high level syntax information, said high level syntax information comprising at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks.

According to a second aspect of at least one embodiment, a storage medium is presented, the storage medium having video signal data encoded thereupon, the video signal being formatted to include information according to a video coding standard and comprising a bitstream having video content and high level syntax information, said high level syntax information comprising at least at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks.

According to a third aspect of at least one embodiment, an apparatus is presented, the apparatus comprising a video encoder for encoding picture data for at least one block in a picture, wherein the encoding is performed using at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks and wherein the parameters are inserted in high level syntax elements of the encoded picture data.

According to a fourth aspect of at least one embodiment, a method is presented, the method comprising encoding picture data for at least one block in a picture, wherein the encoding is performed using at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks, and inserting the parameters in high level syntax elements of the encoded picture data.

According to a fifth aspect of at least one embodiment, an apparatus is presented, the apparatus comprising a video decoder for decoding picture data for at least one block in a picture, wherein the decoding is performed using at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks and wherein the parameters are obtained from high level syntax elements of an encoded picture data.

According to a sixth aspect of at least one embodiment, a method is presented, the method comprising obtaining parameters from high level syntax elements of an encoded picture data and decoding picture data for at least one block in a picture, wherein the decoding is performed using at least one parameter among a parameter representative of a type of partitioning, a parameter representative of a type of intra prediction mode, a parameter representative of a block size adaptation for a Sample Adaptive Offset loop filter and a parameter representative of an illumination compensation mode for bi-prediction blocks.

According to a seventh aspect of at least one embodiment, a non-transitory computer readable medium is presented, the non-transitory computer readable medium containing data content generated according to the third or fourth aspect.

According to a seventh aspect of at least one embodiment, a computer program comprising program code instructions executable by a processor is presented, the computer program implementing the steps of a method according to at least the fourth or sixth aspect.

According to an eighth aspect of at least one embodiment, a computer program product which is stored on a non-transitory computer readable medium and comprises program code instructions executable by a processor is presented, the computer program product implementing the steps of a method according to at least the fourth or sixth aspect.

BRIEF DESCRIPTION OF THE DRAWINGS

FIG. 11 illustrates a flowchart of an example of encoding method according to an embodiment using the new encoding tools.

FIG. 12 illustrates a flowchart of an example of a part of a decoding method according to an embodiment using the new encoding tools.

DETAILED DESCRIPTION

In at least one embodiment, the use of new coding tools described below result into an improvement of coding efficiency. In an example embodiment, efficient signaling of these coding tools is conveying information representative of the coding tools utilized for the encoding, for example from an encoder device to a receiver device (for example a decoder or a display), so that the appropriate tools are used for the decoding stage. These tools comprise new partitioning modes, new intra-prediction modes, improved flexibility for the sample adaptive offset and a new illumination compensation mode for bi-prediction blocks. Therefore, the proposed new syntax gathering a plurality of coding tools provides more efficient video coding.

Figure 1:
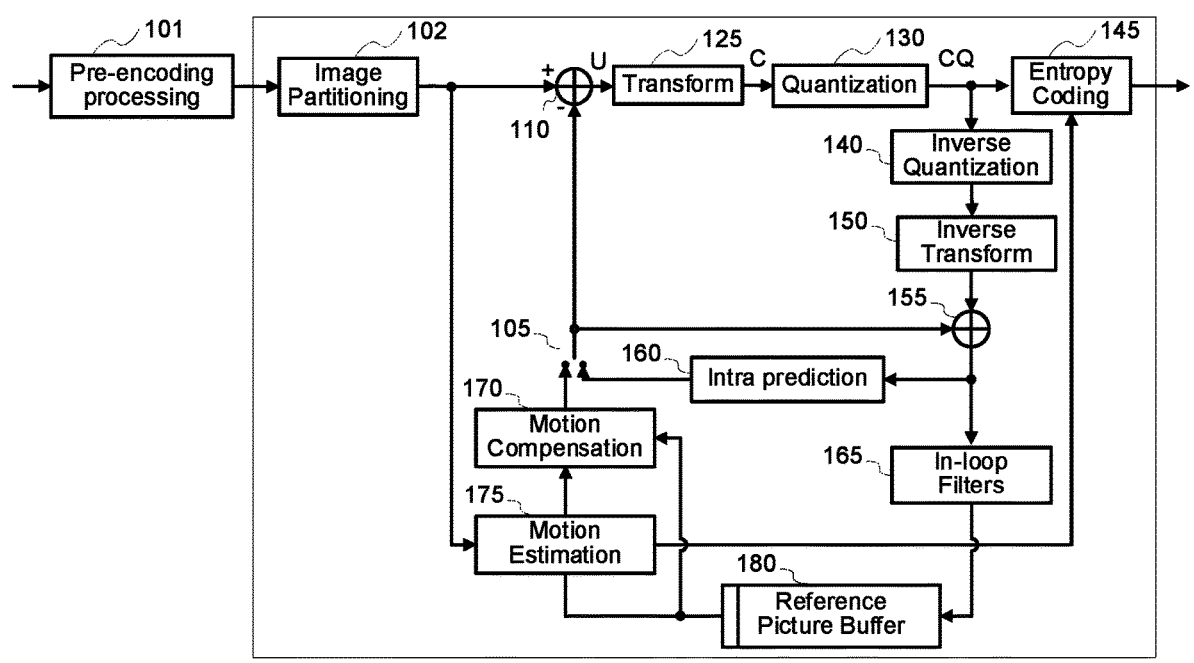
FIG. 1 illustrates an example of video encoder 100, such as a High Efficiency Video Coding (HEVC) encoder.

FIG. 1 illustrates an example of video encoder 100, such as a High Efficiency Video Coding (HEVC) encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team).

In the present application, the terms "reconstructed" and "decoded" may be used interchangeably, the terms "encoded" or "coded" may be used interchangeably, and the terms "image," "picture" and "frame" may be used interchangeably. Usually, but not necessarily, the term "reconstructed" is used at the encoder side while "decoded" is used at the decoder side.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
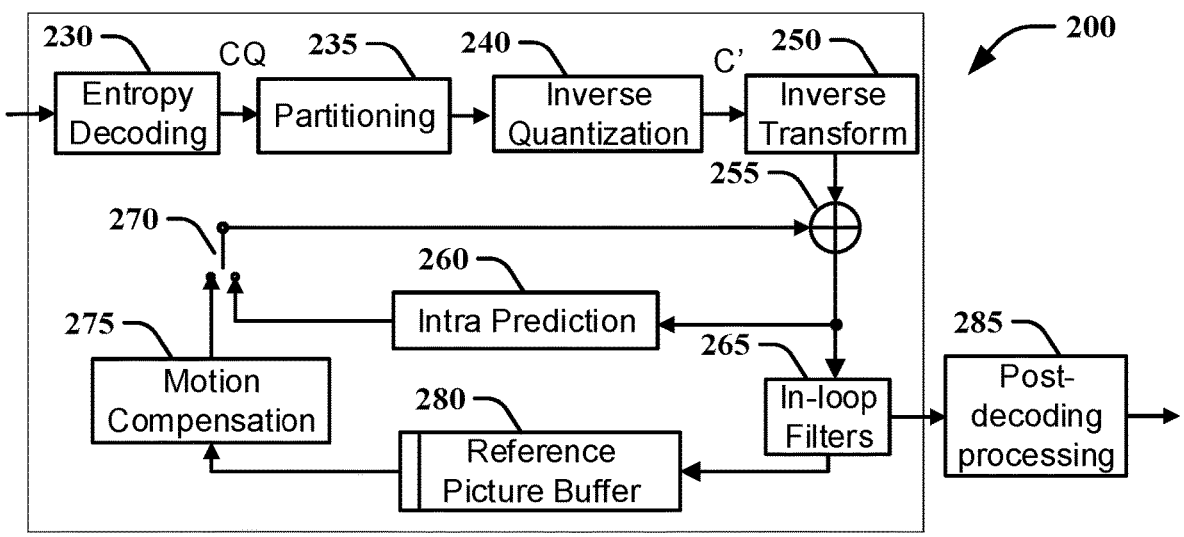
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
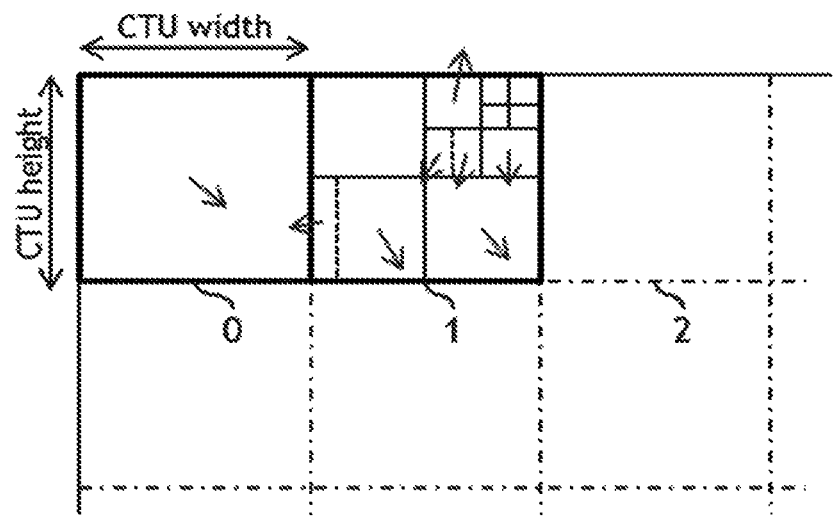
FIG. 3 illustrates an example of coding tree unit and coding tree in the compressed domain.

FIG. 3 illustrates an example of coding tree unit and coding tree in the compressed domain. In the HEVC video compression standard, a picture is divided into so-called Coding Tree Units (CTU), which size is typically 64×64, 128×128, or 256×256 pixels. Each CTU is represented by a Coding Tree in the compressed domain. This is a quad-tree division of the CTU, where each leaf is called a Coding Unit (CU).

Figure 4:
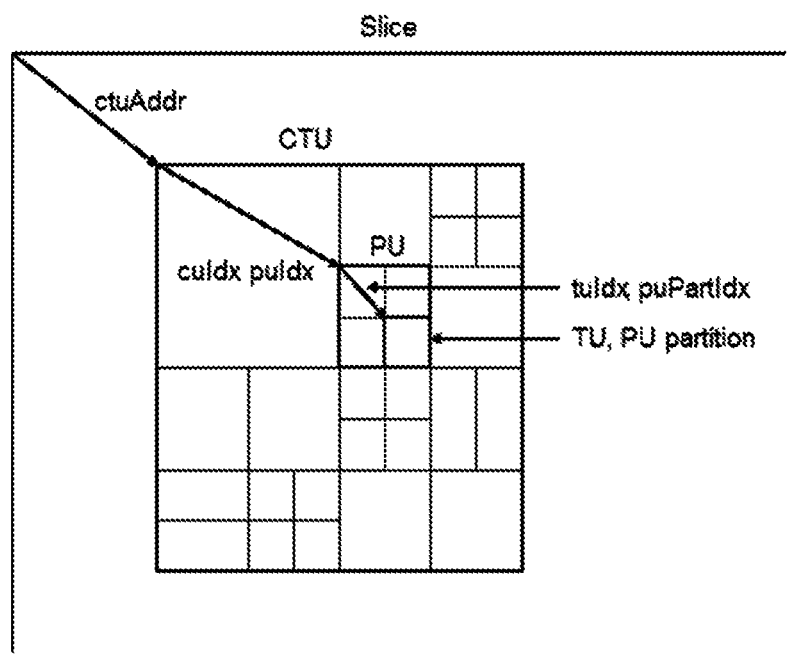
FIG. 4 illustrates an example of division of a CTU into coding units, prediction units and transform units.

FIG. 4 illustrates an example of division of a CTU into coding units, prediction units and transform units. Each CU is then given some Intra or Inter prediction parameters Prediction Info). To do so, it is spatially partitioned into one or more Prediction Units (PUs), each PU being assigned some prediction information. The Intra or Inter coding mode is assigned on the CU level.

New emerging video compression tools include a Coding Tree Unit representation in the compressed domain are proposed to represent picture data in a more flexible way. The advantage of this more flexible representation of the coding tree is that it provides increased compression efficiency compared to the CU/PU/TU arrangement of the HEVC standard.

Figure 5:
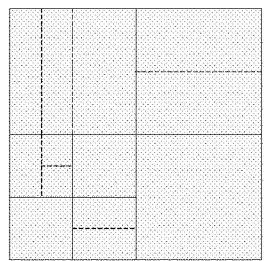
FIG. 5 illustrates an example of Quad-Tree plus Binary-Tree (QTBT) CTU representation.
Figure 5:
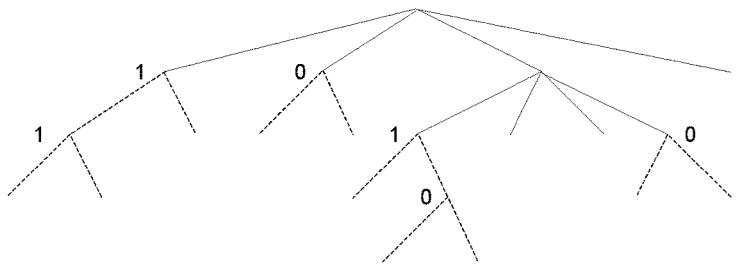

FIG. 5 illustrates an example of Quad-Tree plus Binary-Tree (QTBT) CTU representation. The Quad-Tree plus Binary-Tree (QTBT) coding tool provides such increased flexibility. QTBT consists in a coding tree where coding units can be split both in a quad-tree and in a binary-tree fashion. The splitting of a coding unit is decided on the encoder side through a rate distortion optimization procedure, that determines the QTBT representation of the CTU with minimal rate distortion cost. In the QTBT technology, a CU has either square or rectangular shape. The size of coding unit is always a power of 2, and typically goes from 4 to 128. In additional to this variety of rectangular shapes for a coding unit, such CTU representation has the following different characteristics compared to HEVC. The QTBT decomposition of a CTU is made of two stages: first the CTU is split in a quad-tree fashion, then each quad-tree leaf can be further divide in a binary fashion. This is illustrated on the right side of the figure where solid lines represent the quad-tree decomposition phase and dashed lines represent the binary decomposition that is spatially embedded in the quad-tree leaves. In intra slices, the Luma and Chroma block partitioning structure is separated, and decided independently. No more CU partitioning into predictions units or transform unit is employed. In other words, each Coding Unit is systematically made of a single prediction unit (2N×2N prediction unit partition type) and single transform unit (no division into a transform tree).

Figure 6:
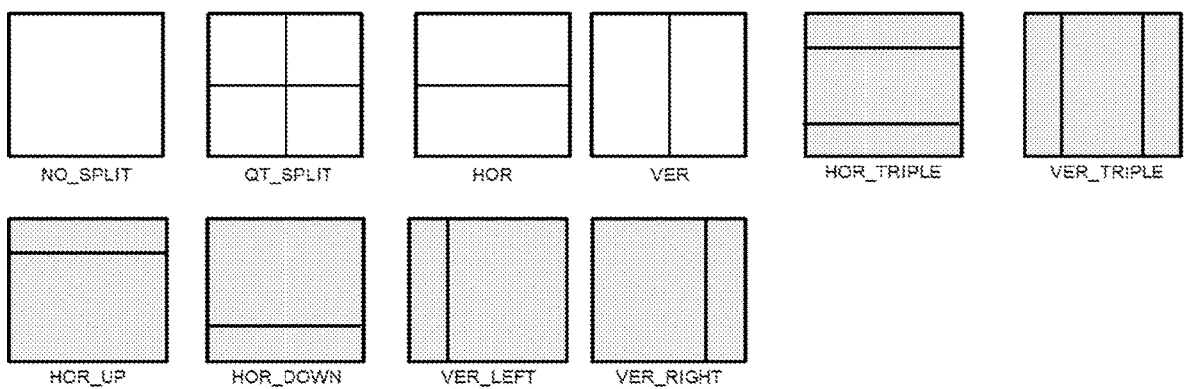
FIG. 6 illustrates an exemplary extended set of Coding Unit partitioning.

FIG. 6 illustrates an exemplary extended set of Coding Unit partitioning. In an asymmetric binary and tree split modes (ABT), a rectangular coding unit with size (w, h) (width and height) that would be split through one of the asymmetric binary splitting modes, for example HOR_UP (horizontal-up), would lead to 2 sub-coding units with respective rectangular sizes $$\left(w, \frac{h}{4}\right) \text{ and } \left(w, \frac{3h}{4}\right).$$

In addition, a so-called triple tree partitioning of a CU may be used, leading to the set of possible partitions given in FIG. 5. Triple tree consists in splitting a CU into tree sub-CU with size (¼, ½, ¼) relative to the parent CU, in the considered orientation (e.g.: HOR_TRIPLE for the horizontal split mode).

A significant coding efficiency improvement is brought using one or more embodiments of the new topologies described above.

Figure 7:
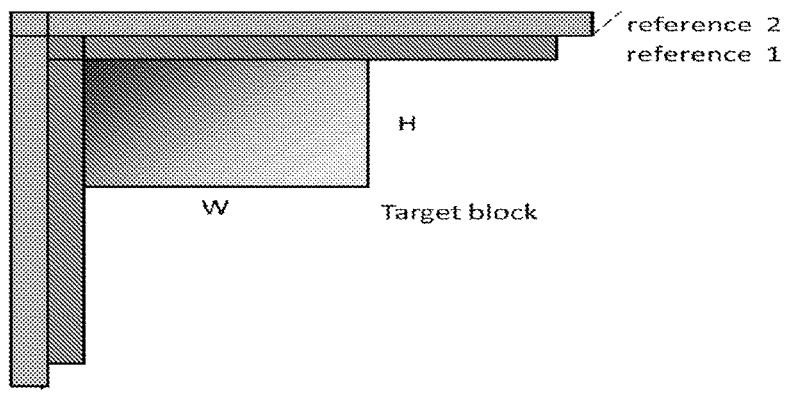
FIG. 7 illustrates an example of intra prediction mode with two reference layers.

FIG. 7 illustrates an example of intra prediction mode with two reference layers. Indeed, new intra prediction modes are considered in the improved syntax. A first new intra perdition mode is named multi-Reference Intra Prediction (MRIP). This tool facilitates the use of multiple reference layers for intra prediction of a block. Typically, 2 reference layers are used for intra prediction, where each reference layer consists of a left reference array and a top reference array. Each reference layer is constructed by the reference sample substitution and then pre-filtered.

Using each reference layer, a prediction for the block is constructed, typically as done in HEVC or in the JEM. The final prediction is formed as a weighted average of the predictions made from the two reference layers. The prediction from the closest reference layer is given higher weight than the prediction from the farthest layer. The typical used weights are 3 and 1.

In the last part of the prediction process, multiple reference layers can be used to smoothen the boundary samples for certain prediction modes, using a mode dependent process.

In an example embodiment, video compression tools include also an adaptative block size for sample adaptive offset (SAO). This tool is a loop filter specified in HEVC. In HEVC, the SAO process classifies the reconstructed samples of one block into several classes and the samples belonging to some classes are corrected with offsets. The SAO parameters are encoded per block or can be inherited from left or above neighboring blocks only.

Further improvements are proposed by defining the SAO palette mode. SAO palette keeps the same SAO parameters per block, but the blocks may inherit these parameters from all the other blocks. This brings more flexibility to SAO by widening the range of possible SAO parameters for one block. The SAO palette is composed of a set of different SAO parameters. For each block, an index is coded to indicate which SAO parameter to use.

Figure 8:
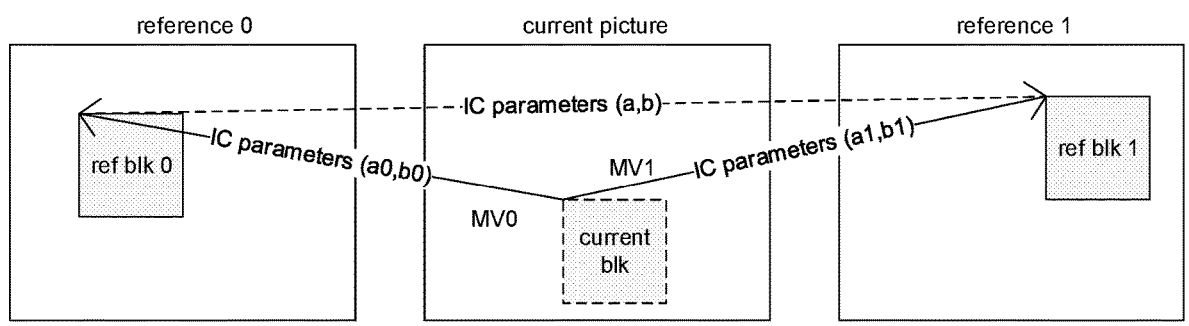
FIG. 8 illustrates an example embodiment of compensation mode for Bi-directional illumination compensation.

FIG. 8 illustrates an example embodiment of compensation mode for Bi-directional illumination compensation. Illumination Compensation (IC) allows correcting block prediction samples (SMC) obtained via motion compensation by possibly considering the spatial or temporal local illumination variation.

$$S_{IC} = a_i \cdot S_{MC} + b_i$$

In case of bi-prediction, the IC parameters are estimated using the samples of the two reference CUs samples as depicted in FIG. 8. First, the IC parameters (a,b) are estimated between the two reference blocks, next the IC parameters (ai,bi)i=0,1 between reference and current blocks are derived as follows:

$$\begin{cases} a_0 = a \cdot \alpha + (1 - \alpha) \\ b_0 = \alpha \cdot b \\ a_1 = \alpha + (1 - \alpha)/a \\ b_1 = -b(1 - \alpha)/a \end{cases} \text{ where: } \alpha = \frac{poc_{cur} - poc_0}{poc_1 - poc_0}$$

If the CU size is smaller or equal to 8 in width or height, the IC parameters are estimated using the uni-directional process. When CU size is greater than 8, the choice between using IC parameters derived from bi-directional or uni-directional process is made by selecting the IC parameters which minimize the difference of the average of the IC compensated reference blocks. The bi-directional optical flow (BIO) is enabled with bi-directional illumination compensation tool.

The plurality of tools introduced above are selected and used by the video encoder 100 and need to be obtained and used by the video decoder 200. For that purpose, information representative of the use of these tools is carried in the coded bitstream generated by the video encoder and obtained by the video decoder 200 in the form of high-level syntax information.

For that purpose, a corresponding syntax is defined and described hereunder. This syntax gathering a plurality of tools allows improved coding efficiency.

This syntax structure uses the HEVC syntax structure as the basis and includes some additional syntax elements. The syntax elements signaled in italic bold font in the following tables correspond to the additional syntax elements according to an example embodiment. It should be noted the syntax elements can take other forms or names than shown in the syntax tables while still handling the same functions. The syntax elements may reside in different levels, for example, some syntax elements can be placed in the sequence parameter set (SPS) and some syntax elements can be placed in the picture parameter set (PPS).

The table 1 below illustrates the sequence parameter set (SPS) and introduces the new syntax elements inserted into this parameter set according to at least one example embodiment, more precisely: multi_type_tree_enabled_primary, log 2_min_cu_size_minus2, log 2_max_cu_size_minus4, log 2_max_tu_size_minus2, sep_tree_mode_intra, multi_type_tree_enabled_secondary, sps_bdip_enabled_flag, sps_mrip_enabled_flag, use_erp_aqp_flag, use_high_perf_chroma_qp_table, abt_one_third_flag, sps_num_intra_mode_ratio.

TABLE 1 modified Sequence Parameter Set

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |

TABLE 1-continued modified Sequence Parameter Set

| | Descriptor |
|---|---|
| sps_seq_parameter_set_id | ue(v) |
| chroma_format_idc | ue(v) |
| if( chroma_format_idc == 3 ) | |
|     separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : | |
|     sps_max_sub_layers_minus1 ); | |
|     i <= sps_max_sub_layers_minus1; i++ ) { | |
|     sps_max_dec_pic_buffering_minus1[i] | ue(v) |
|     sps_max_num_reorder_pics[i] | ue(v) |
|     sps_max_latency_increase_plus1[i] | ue(v) |
| } | |
| multi_type_tree_enabled_primary | ue(v) |
| log2_min_cu_size_minus2 | ue(v) |
| log2_max_cu_size_minus4 | ue(v) |
| log2_max_tu_size_minus2 | ue(v) |
| sep_tree_mode_intra | u(1) |
| if ( sep_tree_mode_intra ) | |
|     multi_type_tree_enabled_secondary | ue(v) |
| sample_adaptive_offset_enabled_flag | u(1) |
| pcm_enabled_flag | u(1) |
| if( pcm_enabled_flag ) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |
|     log2_diff_max_min_pcm_luma_coding_block_size | ue(v) |
|     pcm_loop_filter_disabled_flag | u(1) |
| } | |
| num_short_term_ref_pic_sets | ue(v) |
| for( i = 0; i < num_short_term_ref_pic_sets; i++) | |
|     st_ref_pic_set( i ) | |
| long_term_ref_pics_present_flag | u(1) |
| if( long_term_ref_pics_present_flag ) { | |
|     num_long_term_ref_pics_sps | ue(v) |
|     for( i = 0; i < num_long_term_ref_pics_sps; i++ ) { | |
|         lt_ref_pic_poc_lsb_sps[ i ] | u(v) |
|         used_by_curr_pic_lt_sps_flag[ i ] | u(1) |
|     } | |
| } | |
| sps_temporal_mvp_enabled_flag | u(1) |
| vui_parameters_present_flag | u(1) |
| if( vui_parameters_present_flag ) | |
|     vui_parameters( ) | |
| use_imv | u(1) |
| fruc_merge_mode | u(1) |
| if( fruc_merge_mode ) { | |
|     idx_num_template | ue(v) |
|     idx_num_template_ic | ue(v) |
|     fruc_template_affine | u(1) |
| } | |
| mode_bilateral_TM | ue(v) |
| optical_flow_filtering | ue(v) |
| atmvp_flag | u(1) |
| sps_lic_enabled_flag | u(1) |
| sps_bidir_ic_present_flag | u(1) |
| sps_use_intra_emt | u(1) |
| sps_use_inter_emt | u(1) |
| sps_nsst_enabled_flag | u(1) |
| sps_cross_component_prediction_enabled_flag | u(1) |
| sps_intra_4tap_filter_enabled_flag | u(1) |
| sps_intra_boundary_filter_enabled_flag | u(1) |
| sps_obmc_flag | u(1) |
| if( sps_obmc_flag) | |
|     obmc_blk_size | ue(v) |
|     obmc_for_sub_block | u(1) |
| sps_affine_enabled_flag | u(1) |
| use_NL_Bil_flag | u(1) |
| sps_bdip_enabled_flag | u(1) |
| sps_mrip_enabled_flag | u(1) |
| num_predicted_coef_signs | u(4) |
| mc_frame_pad | u(1) |
| use_erp_aqp_flag | u(1) |
| use_chroma_qp_table | |
| if( use_chroma_qp_table ) | |
|     use_high_perf_chroma_qp_table | u(1) |
| log2_intra131modes_min_area_minus6 | ue(v) |
| log2_intra65modes_min_area_minus4 | ue(v) |
| abt_one_third_flag | u(1) |
| sps_num_intra_mode_ratio | u(1) |
| if( sps_range_extension_flag ) | |
|     sps_range_extension( ) | |
| if( sps_multilayer_extension_flag ) | |
|     sps_multilayer_extension( ) /* specified in | |
|     Annex F */ | |
| if( sps_3d_extension_flag ) | |
|     sps_3d_extension( ) /* specified in Annex I */ | |
| if( sps_extension_5bits ) | |
|     while( more_rbsp_data( ) ) | |
|         sps_extension_data_flag | u(1) |
| rbsp_trailing_bits( ) | |
| } | |

The new syntax elements are defined as follows:

use_high_perf_chroma_qp_table: This syntax element specifies the chroma QP table used to derive the QP used in the decoding of the chroma components associated with a slice, as a function of the base chroma QP associated with the chroma components of the considered slice.

multi_type_tree_enabled_primary: This syntax element indicates the type of partitioning allowed in the coded slices. In at least one implementation, this syntax element is signaled at the sequence level (in the SPS) and therefore applies to all the coded slices that are using this SPS. For instance, a first value of this syntax element allows the quad-tree and binary tree (QTBT) partitioning (NO-SPLIT, QT-SPLIT, HOR and VER of FIG. 5), a second value allows QTBT plus triple-tree (TT) partitioning (NO-SPLIT, QT-SPLIT, HOR, VER, HOR_TRIPLE and VER_TRIPLE of FIG. 5), a third value allows QTBT plus asymmetric binary tree (ABT) partitioning (NO-SPLIT, QT-SPLIT, HOR, VER, HOR-UP, HOR_DOWN, VER_LEFT, and VER_RIGHT of FIG. 5), a fourth value allows QTBT plus TT plus ABT partitioning (all the splitting cases of FIG. 5).

sep_tree_mode_intra: This syntax element indicates if a separate coding tree is used for luma and chroma blocks. When sep_tree_mode_intra is equal to 1, the luma and chroma blocks use independent coding trees, and therefore the partitioning of luma and chroma blocks are independent. In at least one implementation, this syntax element is signaled at the sequence level (in the SPS) and therefore applies to all the coded slices that are using this SPS.

multi_type_tree_enabled_secondary: This syntax element indicates the type of partitioning is allowed for chroma blocks in the coded slices. The values that this syntax element can take are typically the same as those of the syntax element multi_type_tree_enabled_primary. In at least one implementation, this syntax element is signaled at the sequence level (in the SPS) and therefore applies to all the coded slices that are using this SPS.

sps_bdip_enabled_flag: This syntax element indicates the Bi-directional Intra prediction described in JVET-J0022 is allowed in the coded slices contained in the considered coded video sequence.

sps_mrip_enabled_flag: This syntax element indicates the multi-reference intra prediction tool is used in the decoding of the code slices contained in the considered coded video bit-stream.

use_erp_aqp_flag: This syntax element indicates if the spatially adaptive quantization for VR360 ERP content, as described in JVET-J0022, is activated in the coded slices.

abt_one_third_flag: This syntax element indicates if the asymmetric partitioning into two partitions with horizontal or vertical dimension being of ⅓ and ⅔, or ⅔ and ⅓, respectively, of the horizontal or vertical dimension of the initial CU is activated in the coded slices.

sps_num_intra_mode_ratio: This syntax element specifies how to derive the number of intra prediction used for block sizes equal to a multiple of 3 in width or height.

In addition, the following three syntax elements are used to control the size of the coding units (CU) and of the transform units (TU). In at least one implementation, these syntax elements are signaled at the sequence level (in the SPS) and therefore applies to all the coded slices that are using this SPS.

log 2_min_cu_size_minus2 specifies the minimum CU size.

log 2_max_cu_size_minus4 specifies the maximum CU size.

log 2_max_tu_size_minus2 specifies the maximum TU size.

In a variant embodiment, the new syntax elements introduced above are not introduced into the Sequence Parameter Set but in the Picture Parameter Set (PPS).

The table 2 below illustrates the sequence parameter set (SPS) and introduces the new syntax elements inserted into this parameter set according to at least one example embodiment, more precisely:

slice_sao_size_id: This syntax element specifies the size of the blocks on which the SAO applies for the coded slice.

slice_bidir_ic_enable_flag: indicates if the bi-direction illumination compensation is activated for the coded slice.

TABLE 2

| Slice Header | Descriptor |
|---|---|
| slice_segment_header( ) { | |
|     first_slice_segment_in_pic_flag | u(1) |
|     if( nal_unit_type >= BLA_W_LP && nal_unit_type <= RSV_IRAP_VCL23 ) | |
|         no_output_of_prior_pics_flag | u(1) |
|     slice_pic_parameter_set_id | ue(v) |
|     if( !first_slice_segment_in_pic_flag ) { | |
|         if( dependent_slice_segments_enabled_flag ) | |
|             dependent_slice_segment_flag | u(1) |

TABLE 2-continued

| Slice Header | Descriptor |
|---|---|
|         slice_segment_address | u(v) |
|     } | |
|     if( !dependent_slice_segment_flag ) { | |
|         for( i = 0; i < num_extra_slice_header_bits; i++ ) | |
|             slice_reserved_flag[ i ] | u(1) |
|         slice_type | ue(v) |
|         if( output_flag_present_flag ) | |
|             pic_output_flag | u(1) |
|         if( separate_colour_plane_flag = = 1 ) | |
|             colour_plane_id | u(2) |
|         if( nal_unit_type != IDR_W_RADL && nal_unit_type != IDR_N_LP ) { | |
|             slice_pic_order_cnt_lsb | u(v) |
|             short_term_ref_pic_set_sps_flag | u(1) |
|             if( !short_term_ref_pic_set_sps_flag ) | |
|                 st_ref_pic_set( num_short_term_ref_pic_sets ) | |
|             else if( num_short_term_ref_pic_sets > 1 ) | |
|                 short_term_ref_pic_set_idx | u(v) |
|             if( long_term_ref_pics_present_flag ) { | |
|                 if( num_long_term_ref_pics_sps > 0 ) | |
|                     num_long_term_sps | ue(v) |
|                 num_long_term_pics | ue(v) |
|                 for( i = 0; i < num_long_term_sps + num_long_term_pics; i++ ) { | |
|                     if( i < num_long_term_sps ) { | |
|                       if( num_long_term_ref_pics_sps > 1 ) | |
|                           lt_idx_sps[ i ] | u(v) |
|                   } else { | |
|                     poc_lsb_lt[ i ] | u(v) |
|                     used_by_curr_pic_lt_flag[ i ] | u(1) |
|                   } | |
|                 delta_poc_msb_present_flag[ i ] | u(1) |
|                 if( delta_poc_msb_present_flag[ i ] ) | |
|                     delta_poc_msb_cycle_lt[ i ] | ue(v) |
|                 } | |
|             } | |
|         if( sps_temporal_mvp_enabled_flag ) | |
|             slice_temporal_mvp_enabled_flag | u(1) |
|     } | |
|     if( sample_adaptive_offset_enabled_flag ) { | |
|         slice_sao_luma_flag | u(1) |
|         if( ChromaArrayType != 0 ) | |
|             slice_sao_chroma_flag | u(1) |
|     } | |
|     if( slice_sao_luma_flag || slice_sao_chroma_flag ) { | |
|         slice_sao_size_id | u(3) |
|     if( slice_type = = P || slice_type = = B ) { | |
|         num_ref_idx_active_override_flag | u(1) |
|         if( num_ref_idx_active_override_flag ) { | |
|             num_ref_idx_l0_active_minus1 | ue(v) |
|             if( slice_type = = B ) | |
|                 num_ref_idx_l1_active_minus1 | ue(v) |
|         } | |
|     if( lists_modification_present_flag && NumPicTotalCurr > 1 ) | |
|         ref_pic_lists_modification( ) | |
|     if( slice_type = = B ) | |
|         mvd_l1_zero_flag | u(1) |
|     if( cabac_init_present_flag ) | |
|         cabac_init_flag | u(1) |
|     if( slice_temporal_mvp_enabled_flag ) { | |
|         if( slice_type = = B ) | |
|             collocated_from_l0_flag | u(1) |
|         if( ( collocated_from_l0_flag && num_ref_idx_l0_active_minus1 > 0 ) || ( !collocated_from_l0_flag && num_ref_idx_l1_active_minus1 > 0 ) ) | |
|             collocated_ref_idx | ue(v) |
|     } | |
|     if( ( weighted_pred_flag && slice_type = = P ) || ( weighted_bipred_flag && slice_type = = B ) ) | |
|         pred_weight_table( ) | |
|     if( sps_ic_present_flag && slice_type != I ) { | |
|         slice_ic_enable_flag | u(1) |

TABLE 2-continued

Slice Header

| | Descriptor |
|---|---|
| if( sps_bidir_ic_present_flag && | |
| slice_ic_enable_flag ) | |
| slice_bidir_ic_enable_flag | u(1) |
| max_search_depth_region_tree | ue(v) |
| for ( i = 0; i < max_search_depth_region_tree; i++ ) | |
| max_search_depth_prediction_tree[i] | ue(v) |
| if ( slice_type == I ) | |
| for ( i = 0; i < max_search_depth_region_tree; i++ ) | |
| max_search_depth_prediction_tree_chroma[i] | |
| if ( slice_type != I ) | |
| max_num_merge_cand | ue(v) |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( chroma_qp_offset_list_enabled_flag ) | |
| cu_chroma_qp_offset_enabled_flag | u(1) |
| if( deblocking_filter_override_enabled_flag ) | |
| deblocking_filter_override_flag | u(1) |
| if( deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| if( pps_loop_filter_across_slices_enabled_flag && | |
| ( slice_sao_luma_flag \|\| slice_sao_chroma_flag \|\| | |
| !slice_deblocking_filter_disabled_flag ) ) | |
| slice_loop_filter_across_slices_enabled_flag | u(1) |
| } | |
| if( tiles_enabled_flag \|\| entropy_coding_sync_enabled_flag ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset_minus1[ i ] | u(v) |
| } | |
| } | |
| if( pps_clip_adaptive_enable_flag ) | |
| clip_adaptive_flag | u(1) |
| if( clip_adaptive_flag ) { | |
| clip_adaptive_y_min | ue(v) |
| clip_adaptive_y_max | ue(v) |
| clip_adaptive_flag_chroma | u(1) |
| if( clip_adaptive_flag_chroma ) { | |
| clip_adaptive_c0_min | ue(v) |
| clip_adaptive_c0_max | ue(v) |
| clip_adaptive_c1_min | ue(v) |
| clip_adaptive_c1_max | ue(v) |
| } | |
| } | |
| } | |
| if( sps_affine_enabled_flag && slice_type != I ) { | |
| affine_control_flag[0] | u(1) |
| affine_control_flag[1] | u(1) |
| } | |
| if( slice_segment_header_extension_present_flag ) { | |
| slice_segment_header_extension_length | ue(v) |
| for( i = 0; i < slice_segment_header_extension_length; i++) | |
| slice_segment_header_extension_data_byte[ i ] | u(8) |
| } | |
| byte_alignment( ) | |
| } | |

Table 3, 4, 5, 6 below illustrates the coding tree syntax modified to support the additional partitioning modes according to at least one example embodiment. In particular, syntax for enabling the asymmetric partitioning is specified in coding_binary_tree( ). New syntax elements are inserted in the coding tree syntax, more precisely:

asymmetricSplitFlag that indicates if asymmetric binary split is allowed for the current CU and asymmetric_type that indicates the type of the asymmetric binary split. It can take two values, to enable an horizontal split to be up or down, or a vertical split to be left or right.

In addition, the parameter btSplitMode is interpreted differently.

TABLE 3 coding_tree_unit

| | Descriptor |
|---|---|
| coding_tree_unit( ) { | |
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| if( slice_sao_luma_flag \|\| slice_sao_chroma_flag ) | |
| if( slice_type == I ) { | |
| coding_tree( xCtb, yCtb, CtbSizeX, CtbSizeY, LUMA_TREE, 0, 0 ) | |
| coding_tree( xCtb, yCtb, CtbSizeX, CtbSizeY, CHROMA_TREE, 0, 0 ) | |
| } else { | |
| coding_tree( xCtb, yCtb, CtbSizeX, CtbSizeY, LUMA_CHROMA_TREE, 0, 0 ) | |
| } | |
| } | |

TABLE 4 coding_tree

| | Descriptor |
|---|---|
| coding_tree( x0, y0, log2CbSize, cqtDepth ) { | |
| if( x0 + ( 1 << log2CbSize ) <= pic_width_in_luma_samples && | |
| y0 + ( 1 << log2CbSize ) <= pic_height_in_luma_samples && | |
| log2CbSize > MinCbLog2SizeY ) | |
| split_cu_flag[ x0 ][ y0 ] | ae(v) |
| if( split cu flag[ x0 ][ y0 ] ) { | |
| x1 = x0 + ( 1 << ( log2CbSize − 1 ) ) | |
| y1 = y0 + ( 1 << ( log2CbSize − 1 ) ) | |
| coding_tree( x0, y0, log2CbSize − 1, cqtDepth + 1 ) | |
| if( x1 < pic_width_in_luma_samples ) | |
| coding_tree( x1, y0, log2CbSize − 1, cqtDepth + 1 ) | |
| if( y1 < pic_height_in_luma_samples ) | |
| coding_tree( x0, y1, log2CbSize − 1, cqtDepth + 1 ) | |
| if( x1 < pic_width_in_luma_samples && y1 < pic_height_in_luma_samples ) | |
| coding_tree( x1, y1, log2CbSize − 1, cqtDepth + 1 ) | |
| } else | |
| coding_binary_tree( x0, y0, 1<<log2CbSize,1<<log2CbSize,cqtDepth ) | |
| } | |

TABLE 5 coding_binary_tree

| | Descriptor |
|---|---|
| coding_binary_tree( x0, y0, width, height, cqtDepth ) { | |
| if(btSplitAllowed(x0,y0,width,height){ | |
| bt_split_mode(x0,y0,width,height,cqtDepth) | |
| } | |
| if( btSplitFlag ) { | |
| if(btSplitMode==HOR) { | |

TABLE 5-continued coding_binary_tree

```
                                                              Descriptor
            x1 = x0
            y1 = y0 + ( height >> 1 )
            sub_width_1 = sub_width_0 = width;
            sub_height_1 = sub_height_0 = (height >> 1)
        }
        else if(btSplitMode==VER) {
            x1 = x0 + ( width >> 1 )
            y1 = y0
            sub_width_1 = sub_width_0 = ( width >> 1 )
            sub_height_1 = sub_height_0 = height
        }
        else if(btSplitMode==HOR_UP) {
            x1 = x0
            y1 = y0 + ( height >> 2 )
            sub_width_1 = sub_width_0 = width
            sub_height_0 = (height >> 2)
            sub_height_1 = ( (height *3) >> 2)
        }
        else if(btSplitMode==HOR_DOWN) {
            x1 = x0
            y1 = y0 + ( (height*3) >> 2 )
            sub_width_1 = sub_width_0 = width
            sub_height_0 = ( (height *3) >> 2)
            sub_height_1 = (height >> 2)
        }
        else if(btSplitMode==VER_LEFT) {
            x1 = x0 + ( width >> 2 )
            y1 = y0
            sub_width_0 = width >> 2
            sub_width_1 = (width *3) >> 2
            sub_height_1 = sub_height_0 = height
        }
        else if(btSplitMode==VER_RIGHT) {
            x1 = x0 + ( width*3) >> 2
            y1 = y0
            sub_width_0 = (width*3) >> 2
            sub_width_1 = width >> 2
            sub_height_1 = sub_height_0 = height
        }
        coding_binary_tree( x0, y0, sub_width, sub_height,
        cqtDepth )
        if( x1 < pic_width_in_luma_samples && y1 <
        pic_height_in_luma_samples)
                coding_binary_tree( x1, y1, sub_width,
                sub_height, cqtDepth )
        }
    } else
        coding_unit( x0, y0, width, height )
}
```

TABLE 6 bt_split_mode

|  | Descriptor |
|---|---|
| bt_split_mode(x0,y0,width,height,cqtDepth){ | |
|   if( btSplitAllowed(x0,y0,width,height ){ | |
|       btSplitFlag[ x0 ][ y0 ][ cbSizeX ][ cbSizeY ] | ae(v) |
|   } | |
|   if( btSplitFlag[ x0 ][ y0 ][ cbSizeX ][ cbSizeY ] ) { | |
|     if( horizontalSplitAllowed && verticalSplitAllowed ){ | |
|        btSplitOrientation[ x0 ][ y0 ][ cbSizeX ][ cbSizeY ] | ae(v) |
|     } | |
|     if( btSplitOrientation==HOR && | |
|     horizontal_asymmetric_allowed \|\| | |
|     btSplitOrientation==VER && | |
|     vertical_asymmetric_allowed ){ | |
|       asymmetricSplitFlag[ x0 ][ y0 ][ cbSizeX ][ cbSizeY ] | ae(v) |
|       if( asymmetricSplitFlag==true ){ | |
|         asymmetric_type[ x0 ][ y0 ][ cbSizeX ][ cbSizeY ] | ae(v) |

TABLE 6-continued bt_split_mode

|  | Descriptor |
|---|---|
|       } | |
|     } | |
|   } | |
| } | |

Figure 9:
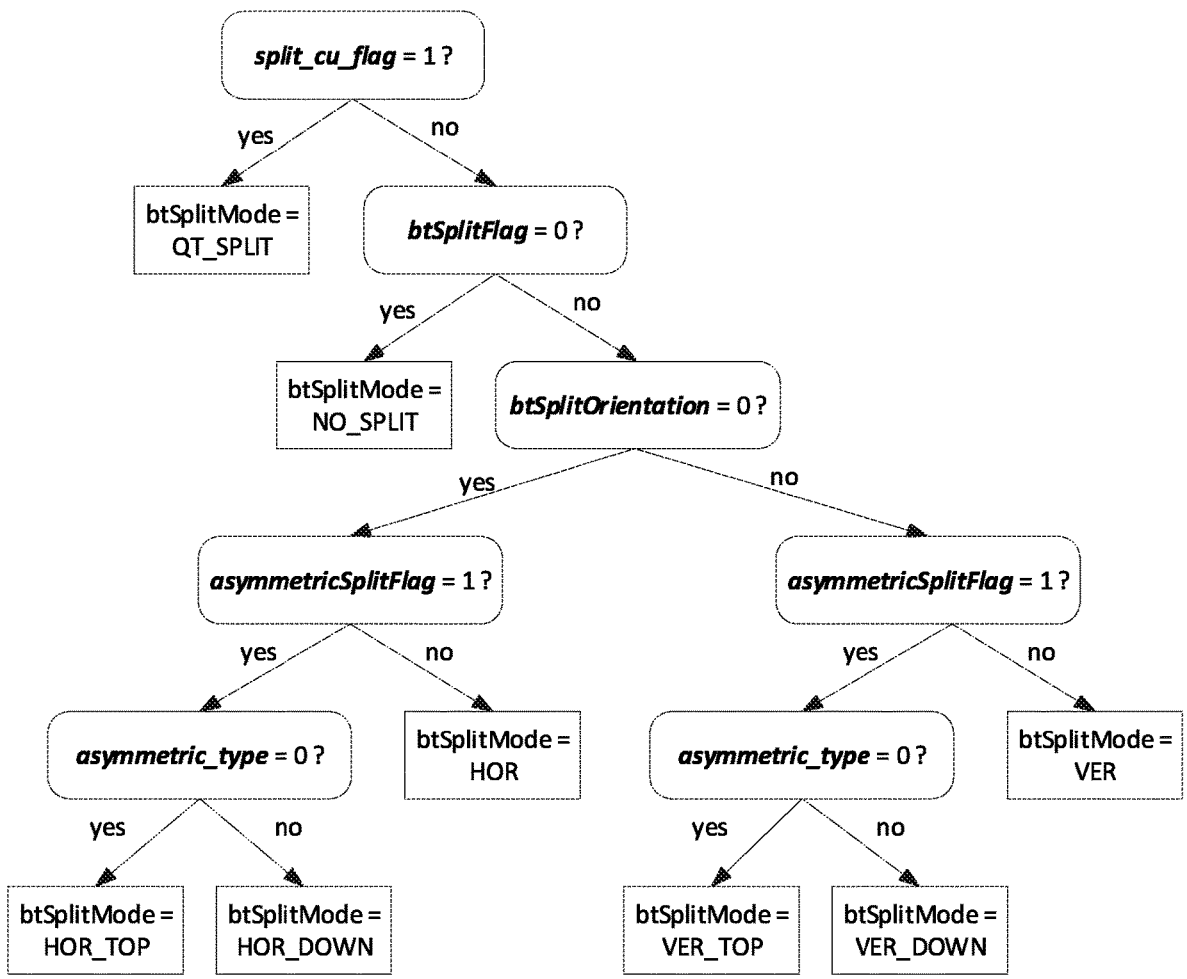
FIG. 9 illustrates the interpretation of the bt-split-flag according to an example embodiment.

FIG. 9 illustrates the interpretation of the bt-split-flag according to at least one example embodiment. The two syntax elements asymmetricSplitFlag and asymmetric_type are used to specify the value of the parameter btSplitMode. btSplitMode indicates the binary split mode that applies to the current CU. btSplitMode is derived differently than in the prior-art. In JEM, it can take the values HOR, VER. In the improved syntax, it can take in addition the values HOR_UP, HOR_DOWN, VER_LEFT, VER_RIGHT, corresponding to partitioning as illustrated in FIG. 6.

The table 7, 8, 9 and 10 below illustrates the coding unit syntax elements and introduces the new syntax element for the bi-directional intra prediction mode.

TABLE 7 coding_unit

|  | Descriptor |
|---|---|
| coding_unit( x0, y0, cuWidth, cuHeight, treeMode ) { | |
|   if( transquant_bypass_enabled_flag ) | |
|       cu_transquant_bypass_flag | ae(v) |
|   if( slice_type != I ) | |
|     cu_skip_flag[ x0 ][ y0 ] | ae(v) |
|   if(cu_skip_flag[ x0 ][ y0 ]) | |
|     cu_data_merge( x0, y0, cuWidth, cuHeight, treeMode ) | |
|   else { | |
|     if( slice_type != I ) | |
|       pred_mode_flag | ae(v) |
|     if( cuPredMode[ x0 ][ y0 ] = = MODE_INTRA ) | |
|       cu_data_intra( x0, y0, cuWidth, cuHeight, treeMode ) | |
|     else { | |
|       merge_flag[ x0][ y0 ] | ae(v) |
|       if( merge_flag[ x0 ][ y0 ] ) | |
|         cu_data_merge( x0, y0, cuWidth, cuHeight, treeMode ) | |
|       else | |
|         cu_data_inter( x0, y0, cuWidth, cuHeight, treeMode ) | |
|     if( cuPredMode[ x0 ][ y0 ] != MODE_INTRA | |
|     && !( merge_flag[ x0 ][ y0 ] ) | |
|       rqt_root_cbf | ae(v) |
|     if( rqt_root_cbf ) | |
|       cu_residual_data( x0, y0, cuWidth, cuHeight, treeMode ) | |
|     } | |
|   } | |
| } | |

TABLE 8 cu_data_merge

|  | Descriptor |
|---|---|
| cu_data_merge( x0, y0, cuWidth, cuHeight, treeMode ) { | |
|   if( fruc_merge_enabled_flag ) | |
|       fruc_merge_mode[ x0 ][ y0 ] | ae(v) |
|   if( fruc_merge_mode[ x0 ][ y0 ] ) | |
|     if( lic_enabled_flag && | |

TABLE 8-continued

| cu_data_merge | Descriptor |
|---|---|
|     fruc_merge_mode[ x0 ][ y0 ] == 1 ) | |
|         lic_flag[ x0 ][ y0 ] | ae(v) |
|     if(fruc_merge_mode[ x0 ][ y0 ] == 1 && | |
| MaxNumMergeCand > 1) | |
|         merge_idx[ x0 ][ y0 ] | ae(v) |
|     if( lic_enabled_flag ) | |
|         lic_flag[ x0 ][ y0 ] | ae(v) |
|     else | |
|         if( MaxNumMergeCand > 1) | |
|             merge_idx[ x0 ][ y0 ] | |
| } | |

TABLE 9

| cu_data_intra | Descriptor |
|---|---|
| cu_data_intra( x0, y0, cuWidth, cuHeight, treeMode ) { | |
|   if( treeMode & LUMA_TREE ) { | |
|     prev_intra_luma_pred_flag[ x0 ][ y0 ] | ae(v) |
|     if( prev_intra_luma_pred_flag[ x0 ][ y0 ] ) { | |
|       mpm_idx[ x0 ][ y0 ] | ae(v) |
|     } else { | |
|       second_mpm_flag[ x0 ][ y0 ] | ae(v) |
|       if( second_mpm_flag[ x0 ][ y0 ] ) | |
|         second_mpm[ x0 ][ y0 ] | f(5) |
|       else | |
|         rem_intra_luma_pred_mode[ x0 ][ y0 ] | ae(v) |
|     } | |
|     if( bdip_enable_flag && ((luma_mode >= 2 && luma_mode < 18) ‖ (luma_mode >= 114 && luma_mode < 130) | |
|       bdip_enable_flag[ x0 ][ y0 ] | ae(v) |
|   } | |
|   if( treeMode & CHROMA_TREE ) { | |
|     intra_chroma_pred_mode[ x0 ][ y0 ] | ae(v) |
|   } | |
| } | |

TABLE 10

| cu_data_inter | Descriptor |
|---|---|
| cu_data_inter( x0, y0, cuWidth, cuHeight, treeMode ) { | |
|   if( slice_type == B ) | |
|     inter_pred_idc[ x0 ][ y0 ] | ae(v) |
|   if( affine_enabled_flag && cuWidth > 8 && cuHeight > 8 ) | |
|     affine_flag[ x0 ][ y0 ] | ae(v) |
|   if( inter_pred_idc[ x0 ][ y0 ] != PRED_L1 ) { | |
|     if( num_ref_idx_l0_active_minus1 > 0 ) | |
|       ref_idx_l0[ x0 ][ y0 ] | ae(v) |
|     if( affine_flag[ x0 ][ y0 ] ) { | |
|       mvd_gr0( x0, y0, 0, AFFINE_LEFT ) | ae(v) |
|       mvd_gr0( x0, y0, 0, AFFINE_RIGHT ) | ae(v) |
|     } else | |
|       mvd_gr0 ( x0, y0, 0, AFFINE_OFF ) | |
|     mvp_l0_flag[ x0 ][ y0 ] | ae(v) |
|   } | |
|   if( inter_pred_idc[ x0 ][ y0 ] != PRED_L0 ) { | |
|     if( num_ref_idx_l1_active_minus1 > 0 ) | |
|       ref_idx_l1[ x0 ][ y0 ] | ae(v) |
|     if( mvd_l1_zero_flag && | |
|       inter_pred_idc[ x0 ][ y0 ] == PRED_BI ) { | |
|       MvdL1[ x0 ][ y0 ][ 0 ] = 0 | |
|       MvdL1[ x0 ][ y0 ][ 1 ] = 0 | |
|     } else if( affine_flag[ x0 ][ y0 ] ) { | |
|       mvd_gr0( x0, y0, 1, AFFINE_LEFT ) | ae(v) |

TABLE 10-continued

| cu_data_inter | Descriptor |
|---|---|
|       mvd_gr0( x0, y0, 1, AFFINE_RIGHT ) | ae(v) |
|     } else | |
|       mvd_gr0( x0, y0, 1, AFFINE_OFF ) | |
|     mvp_l1_flag[ x0 ][ y0 ] | ae(v) |
|   } | |
|   if( imv_enabled_flag && CuHasNonZeroMvd ) | |
|     imv_mode[ x0 ][ y0 ] | ae(v) |
|   if( affine[ x0 ][ y0 ] ‖ CuHasNonZeroMvd ) | |
|   { | |
|     if( inter_pred_idc[ x0 ][ y0 ] != PRED_L1 ) { | |
|       if( affine_flag[ x0 ][ y0 ] ) { | |
|         mvd_remain( x0, y0, 0, AFFINE_LEFT ) | ae(v) |
|         mvd_remain( x0, y0, 0, AFFINE_RIGHT ) | ae(v) |
|       } else | |
|         mvd_ remain( x0, y0, 0, AFFINE_OFF ) | ae(v) |
|     } | |
|     if( inter_pred_idc[ x0 ][ y0 ] != PRED_L0 ) { | |
|       if( mvd_l1_zero_flag && | |
|         inter_pred_idc[ x0 ][ y0 ] == PRED_BI ) { | |
|         MvdL1[ x0 ][ y0 ][ 0 ] = 0 | |
|         MvdL1[ x0 ][ y0 ][ 1 ] = 0 | |
|       } else if( affine_flag[ x0 ][ y0 ] ) { | |
|         mvd_gr0( x0, y0, 1, AFFINE_LEFT ) | ae(v) |
|         mvd_gr0( x0, y0, 1, AFFINE_RIGHT ) | ae(v) |
|       } else | |
|         mvd_gr0( x0, y0, 1, AFFINE_OFF ) | ae(v) |
|     } | |
|   } | |
|   if( obmc_enabled_flag && cuWidth*cuHeight <= 16*16 ) | |
|     obmc_flag[ x0 ][ y0 ] | ae(v) |
|   if( lic_enabled_flag && !affine_flag[ x0 ][ y0 ] ) | |
|     lic_flag[ x0 ][ y0 ] | ae(v) |
| } | |

TABLE 11

| cu_residual_data | Descriptor |
|---|---|
| cu_residual_data( x0, y0, cuWidth, cuHeight, treeMode ) { | |
|     if( treeMode & CHROMA_TREE ) { | |
|       cbf_cb[ x0 ][ y0 ] | ae(v) |
|       cbf_cr[ x0 ][ y0 ] | ae(v) |
|     } | |
|     if( treeMode & LUMA_TREE ) { | |
|       if( cuPredMode[ x0 ][ y0 ] == MODE_INTRA ‖ | |
|         cbf_cb[ x0 ][ y0 ] ‖ cbf_cr[ x0 ][ y0 ] ) | |
|         cbf_luma[ x0 ][ y0 ] | ae(v) |
|     } | |
|     if( treeMode & CHROMA_TREE ) { | |
|       if( cbf_cb[ x0 ][ y0 ] ) | |
|         residual_coding( x0, y0, cuWidth / 2, cuHeight / 2, treeMode, 1 ) | |
|       if( cbf_cr[ x0 ][ y0 ] ) | |
|         residual_coding( x0, y0, cuWidth / 2, cuHeight / 2, treeMode, 2 ) | |
|     } | |
|     if( treeMode & LUMA_TREE ) { | |
|       if( emt_enable_flag && cuWidth <= 64 && cuHeight <= 64 ) | |
|         emt_cu_flag[ x0 ][ y0 ] | ae(v) |
|       residual_coding( x0, y0, cuWidth, cuHeight, treeMode, 0 ) | |
|     } | |
| } | |

Several of the syntax elements discussed in this document are defined as arrays. For instance, btSplitFlag is defined as an array of dimension 4, indexed by the horizontal and vertical positions in the picture, and by the coded block horizontal and vertical sizes For notation simplifications, in the semantic description of the syntax elements, the indexes are not kept (for instance, btSplitFlag[x0][y0][cbSizeX][cbSizeY] is noted simply btSplitFlag).

Figure 10:
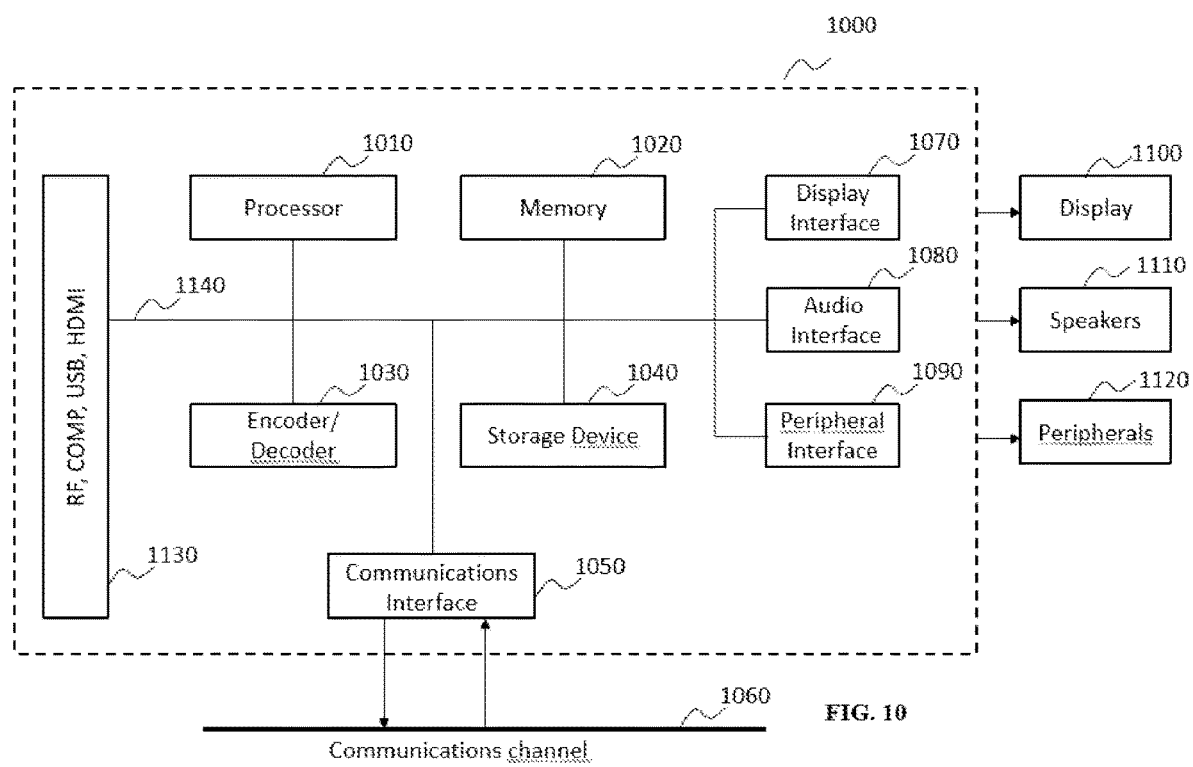
FIG. 10 illustrates a block diagram of an example of a system in which various aspects and embodiments are implemented.

FIG. 10 illustrates a block diagram of an example of a system in which various aspects and embodiments are implemented. System 1000 can be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

FIG. 11 illustrates a flowchart of an example of encoding method according to an embodiment using the new encoding tools. Such an encoding method can be performed by the system 1000 described in FIG. 10 and more precisely can be implemented by the processor 1010. In at least one embodiment, in step 1190, the processor 1010 selects the encoding tools to be used. The selection can be done using different techniques. The selection can be done by the user through an encoding configuration parameter (typically a flag), which indicates the tools to be used (as well as the corresponding parameters if required) during the encoding and the decoding processes. In an example embodiment, the selection is done by setting a value of a value in a file, the flag being read by an encoding device that interprets the value of the flag to select which tool to use. In an example embodiment, the selection is done by a manual operation of a user selecting encoding configuration parameters using a graphical user interface that handles the encoder device. Once this selection is done, the encoding is performed in step 1193 utilizing the selected tool among other encoding tools and the selection of the tools is signaled in the high-level syntax elements (for example in the next SPS, PPS or even slice header).

FIG. 12 illustrates a flowchart of an example of a part of a decoding method according to an embodiment using the new encoding tools. Such a decoding method can be performed by the system 1000 described in FIG. 10 and more precisely can be implemented by the processor 1010. In at least one embodiment, in step 1200, the processor 1010 accesses the signal (for example received on an input interface or read from a media support), extracts and analyzes the high level syntax elements to determine the tools that have been selected at the encoding device. In step 1210, these tools are used to perform the decoding and to produce a decoded image that can be for example provided to a device or displayed on a device.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

In a variant of first, second, third, fourth, fifth, sixth, seventh and eighth aspect of at least an embodiment, the parameter representative of type of partitioning comprises a first value for a quad-tree and binary tree partitioning, a second value for a quad-tree and binary tree partitioning plus triple-tree partitioning, a third value for a quad-tree and binary tree partitioning plus asymmetric binary tree partitioning and a fourth value for a quad-tree and binary tree partitioning plus triple-tree partitioning plus asymmetric binary tree partitioning.

In a variant of first, second, third, fourth, fifth, sixth, seventh and eighth aspect of at least an embodiment, the parameters further comprise a size of blocks on which the Sample Adaptive Offset applies for a coded slice.

In a variant of first, second, third, fourth, fifth, sixth, seventh and eighth aspect of at least an embodiment, the type of intra prediction mode comprises at least one of an intra bi-prediction mode and a multi-reference intra prediction mode.

The invention claimed is:

1. An apparatus for encoding picture data of a video, comprising:
   at least one processor configured to:
      obtain the picture data;
      determine that the encoding of the picture data should use independent coding trees for a plurality of luma and chroma blocks and determine the types of partitioning allowed for the chroma blocks;
      insert a single flag and at least one parameter representative of types of partitioning allowed for the chroma blocks in a sequence parameter set of the encoded picture data, the single flag indicating that the encoding uses independent coding trees for the plurality of luma and chroma blocks; and
      encode the picture data for at least one block in a picture and the sequence parameter set for a plurality of blocks to produce an encoded bitstream, wherein the encoding uses the determined types of partitioning allowed for the chroma blocks.

2. The apparatus of claim 1, wherein when the single flag is equal to 1, the plurality of luma and chroma blocks use independent coding trees and when the single flag is equal to zero, a common coding tree is used for the plurality of luma and chroma blocks.

3. The apparatus of claim 1, wherein the single flag is signaled in a sequence parameter set at the sequence level to apply to all coded slices using said sequence parameter set.

4. The apparatus of claim 1, further comprising a file input interface and wherein the determination is done by reading a value of a flag in a file.

5. The apparatus of claim 1, further comprising a graphical user interface and wherein the determination is done by obtaining an encoding configuration parameter from the graphical user interface.

6. A method for encoding picture data of a video, the method comprising:
   obtaining the picture data;
   determining that the encoding of the picture data should use independent coding trees for a plurality of luma and chroma blocks and determine the types of partitioning allowed for the chroma blocks;
   inserting a single flag and at least one parameter representative of types of partitioning allowed for the chroma blocks in a sequence parameter set of the encoded picture data, the single flag indicating that the encoding uses independent coding trees for the plurality of luma and chroma blocks; and
   encoding the picture data for at least one block in a picture and the sequence parameter set for a plurality of blocks to produce an encoded bitstream, wherein the encoding uses the determined types of partitioning allowed for the chroma blocks.

7. The method of claim 6, wherein when the single flag is equal to 1, the plurality of luma and chroma blocks use independent coding trees and when the single flag is equal to zero, a common coding tree is used for the plurality of luma and chroma blocks.

8. The method of claim 6, wherein the single flag is signaled in a sequence parameter set at the sequence level to apply to all coded slices using said sequence parameter set.

9. A non-transitory computer readable medium having stored thereon program code instructions executable by a processor for implementing the steps of a method according to claim 6.

10. The method of claim 6, wherein the determination is done by reading a value of a flag in a file.

11. The method of claim 6, wherein the determination is done by obtaining an encoding configuration parameter from a graphical user interface.

12. An apparatus for decoding picture data of a video, comprising:
at least one processor configured to:
receive encoded picture data;
decode a single flag and at least one parameter representative of types of partitioning allowed for the chroma blocks from a sequence parameter set of the encoded picture data;
determine that the single flag indicates that the encoded picture data uses independent coding trees for a plurality of luma and chroma blocks;
determine the types of partitioning allowed for the chroma blocks; and
decode picture data for at least one block in a picture using independent coding trees for the plurality of luma and chroma blocks and using the determined types of partitioning allowed for the chroma blocks.

13. The apparatus of claim 12, wherein when the single flag is equal to 1, the plurality of luma and chroma blocks use independent coding trees and when the single flag is equal to zero, a common coding tree is used for the plurality of luma and chroma blocks.

14. The apparatus of claim 12, wherein the single flag is signaled in a sequence parameter set at the sequence level to apply to all coded slices using said sequence parameter set.

15. The apparatus of claim 12, wherein, a first value of the parameter representative of types of partitioning for the chroma blocks allows quad-tree and binary tree partitioning, a second value of the parameter representative of types of partitioning for the chroma blocks allows quad-tree, binary tree and triple tree partitioning and a third value of the parameter representative of types of partitioning for the chroma blocks allows quad-tree, binary tree and asymmetric binary tree partitioning.

16. A method for decoding picture data of a video, the method comprising:
receiving encoded picture data;
decoding a single flag and at least one parameter representative of types of partitioning allowed for the chroma blocks from a sequence parameter set of the encoded picture data;
determining that the single flag indicates that the encoded picture data uses independent coding trees for a plurality of luma and chroma blocks;
determining the types of partitioning allowed for the chroma blocks; and
decoding picture data for at least one block in a picture using independent coding trees for the plurality of luma and chroma blocks and using the determined types of partitioning allowed for the chroma blocks.

17. The method of claim 16, wherein when the single flag is equal to 1, the plurality of luma and chroma blocks use independent coding trees and when the single flag is equal to zero, a common coding tree is used for the plurality of luma and chroma blocks.

18. The method of claim 16, wherein the single flag is signaled in a sequence parameter set at the sequence level to apply to all coded slices using said sequence parameter set.

19. A non-transitory computer readable medium having stored thereon program code instructions executable by a processor for implementing the steps of a method according to claim 16.

20. The method of claim 16, wherein, a first value of the parameter representative of types of partitioning for the chroma blocks allows quad-tree and binary tree partitioning, a second value of the parameter representative of types of partitioning for the chroma blocks allows quad-tree, binary tree and triple tree partitioning and a third value of the parameter representative of types of partitioning for the chroma blocks allows quad-tree, binary tree and asymmetric binary tree partitioning.

\* \* \* \* \*